United States Patent [19]

Guitaut et al.

[11] 4,397,433
[45] Aug. 9, 1983

[54] REVOLVING-CYLINDER JETTISON DEVICE FOR TRANSPORTING AND RELEASING BUOYS ON AND FROM AIRCRAFT

[75] Inventors: Philippe P. Guitaut, Savigny sur Orge; Pierre F. Coutin, Paris, both of France

[73] Assignee: R. Alkan & Cie, France

[21] Appl. No.: 243,403

[22] Filed: Mar. 13, 1981

[30] Foreign Application Priority Data

Mar. 26, 1980 [FR] France ................ 80 06701

[51] Int. Cl.³ .................................. B64D 1/02
[52] U.S. Cl. ........................ 244/137 R; 244/118.1; 89/1.5 R; 89/1.801
[58] Field of Search ............ 244/136, 137 R, 138 R, 244/118.1; 89/1.5 R, 1.5 H, 1.801–1.806, 45–47; 124/48; 367/3, 4

[56] References Cited

U.S. PATENT DOCUMENTS

| 1,721,883 | 7/1929 | Monteith et al. | 89/1.5 R |
|---|---|---|---|
| 2,587,690 | 3/1952 | Brereton | 89/46 |
| 2,723,093 | 11/1955 | Price et al. | 244/137 R |
| 2,971,731 | 2/1961 | Graw | 244/137 R |
| 3,808,941 | 5/1974 | Biggs | 89/1.5 R |
| 4,164,887 | 8/1979 | Ouellette | 89/1.5 R |
| 4,263,835 | 4/1981 | Dragmuk | 89/1.5 R |
| 4,313,363 | 2/1982 | Schreckenberg | 89/46 |

FOREIGN PATENT DOCUMENTS

| 272835 | 4/1914 | Fed. Rep. of Germany | 89/1.5 H |
|---|---|---|---|
| 201004 | 7/1923 | United Kingdom | 89/1.5 R |
| 559725 | 3/1944 | United Kingdom | 89/1.5 R |

Primary Examiner—Galen L. Barefoot
Attorney, Agent, or Firm—William A. Drucker

[57] ABSTRACT

A revolver-cylinder type jettison device for transporting and jettisoning buoys on and from aircraft which comprises a number of jettisoning tubes each adapted to be loaded either with a single long buoy or with a pair of short buoys, and to be brought selectively to the jettisoning position by rotating the revolver-cylinder so that the selected tube overlies a single and common ejection and guide barrel formed in the aircraft. Each tube comprises buoy wedging and retaining devices for the two loading modes, the wedging device being so arranged as to retract automatically during the jettisoning, the retaining device being actuated by a pair of release cylinders. The buoys are ejected under the control of a pair of ejection cylinders responsive to upper and lower arms, the lower arm being retractable.

4 Claims, 6 Drawing Figures

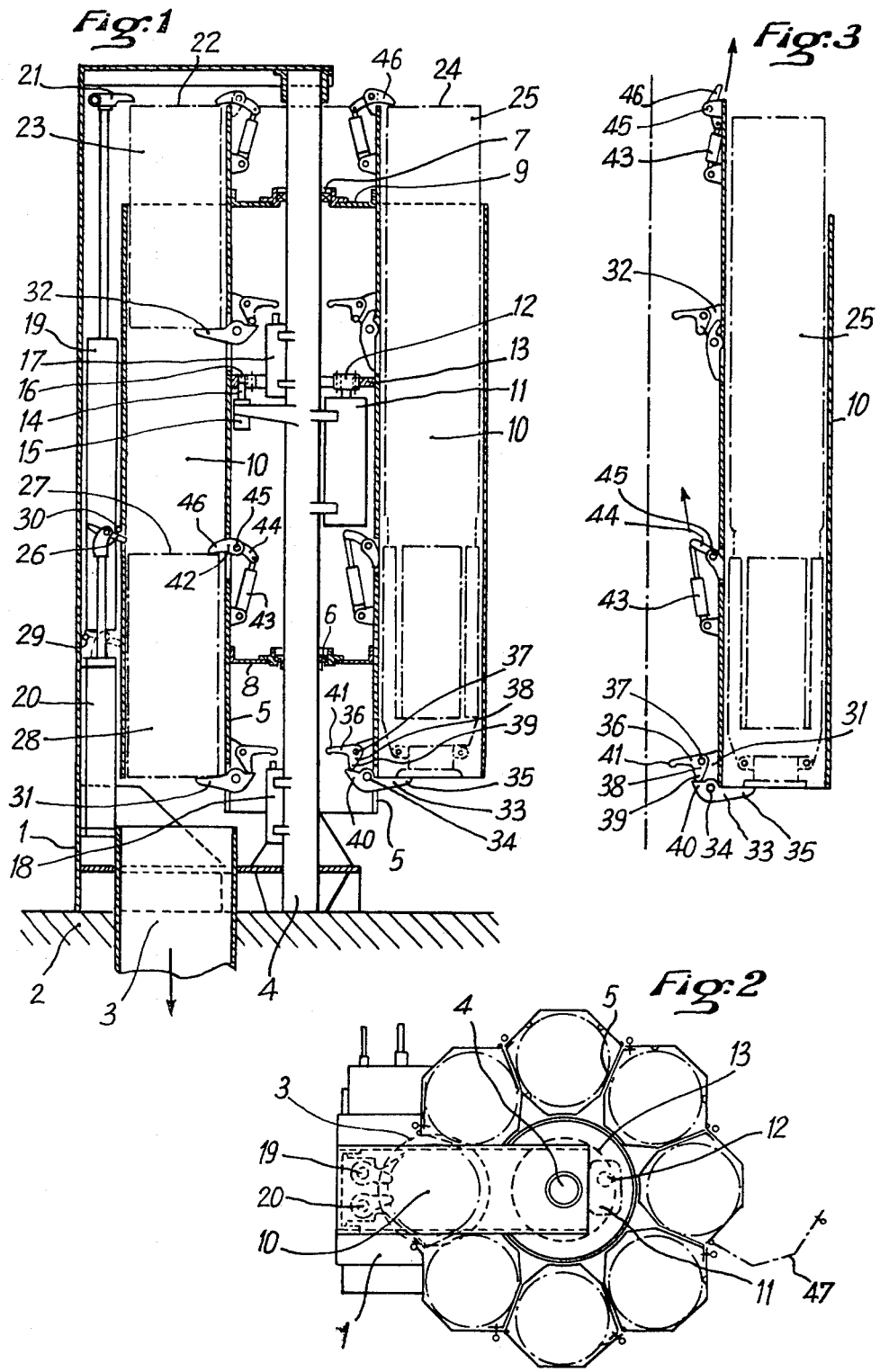

REVOLVING-CYLINDER JETTISON DEVICE FOR TRANSPORTING AND RELEASING BUOYS ON AND FROM AIRCRAFT

BACKGROUND OF THE INVENTION

The present invention relates in general to devices for transporting and jettisoning miscellaneous objects on and from aircraft and has specific reference to a jettison device for transporting and releasing buoys Various jettison devices have already been developed in the art and utilized on board aircraft or helicopters. It is the primary object of the present invention to provide a device of this character which is of the so-called revolving-cylinder type and characterised notably in that it comprises a plurality of tubes each adapted to be loaded with a long buoy or two short buoys, each tube comprising mechanical locking and release or jettisoning means consistent with these two possible loading modes. The release and ejection means consist simply of four pneumatic cylinders with which the selected buoy-carrying tubes can be brought successively into proper alignment before firing.

Reference will now be made to the accompanying drawings illustrating diagrammatically an exemplary form of embodiment of the jettison device of this invention.

BRIEF DESCRIPTION OF THE DRAWINGS

FIG. 1 is a vertical section of the complete device;

FIG. 2 is a plane view from above of the same device;

FIG. 3 is a fragmentary vertical section showing the position of the locking and retaining means prior to the introduction of a long buoy into a tube;

DESCRIPTION OF THE PREFERRED EMBODIMENT

Figure 4:
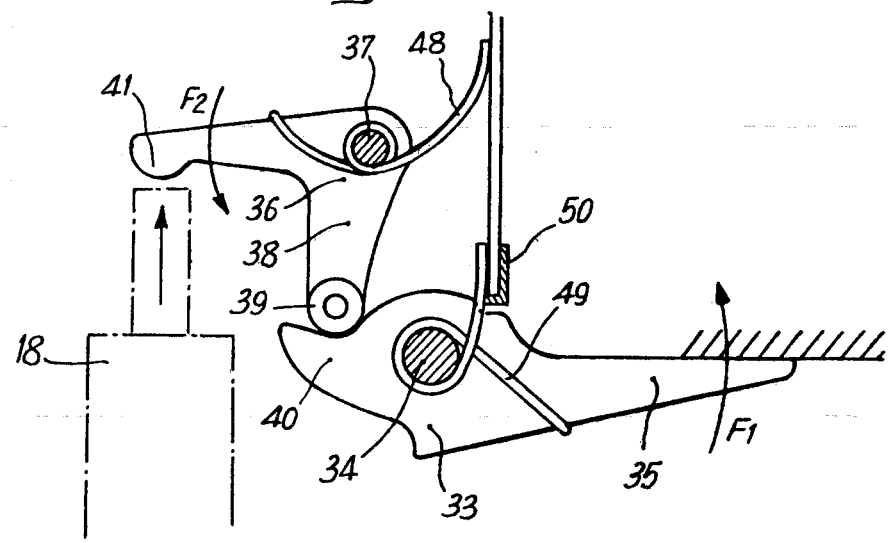
FIG. 4 illustrates on a larger scale a retaining device in its locking position.

Referring first to FIG. 1, the reference numeral 1 designates the frame structure anchored to the aircraft, for example on the floor 2, the latter being provided with a single ejection passage or barrel 3. Fastened to this structure is the rigid supporting shaft 4 about which the "revolver" cylinder 5 is rotatably mounted with the interposition of suitable bearings 6, 7, preferably of the ball or roller type. These bearings are rigidly secured to trays 8 and 9 supporting the buoy-carrying tubes 10.

The revolver-cylinder is adapted to be rotated about shaft 4 by means of a fixed electric motor 11 having an output pinion 12 in constant meshing engagement with an internally toothed annulus 13 rigid with the revolver-cylinder 5, so that the buoy-carrying tubes 10 can be brought at will and successively in axial alignment with the ejection passage or barrel 3.

The revolver-cylinder 5 is accurately positioned in each firing position by means of a wedge or key 14 rigid with shaft 4 and responsive to an electromagnet or pneumatic actuator 15. This wedge 14 is adapted to engage the selected keeper 16 carried by the cylinder 5 and consisting for example of a cavity formed in the internally toothed annulus 13. A keeper 16 is provided on each buoy-carrying tube 10.

Figure 6:
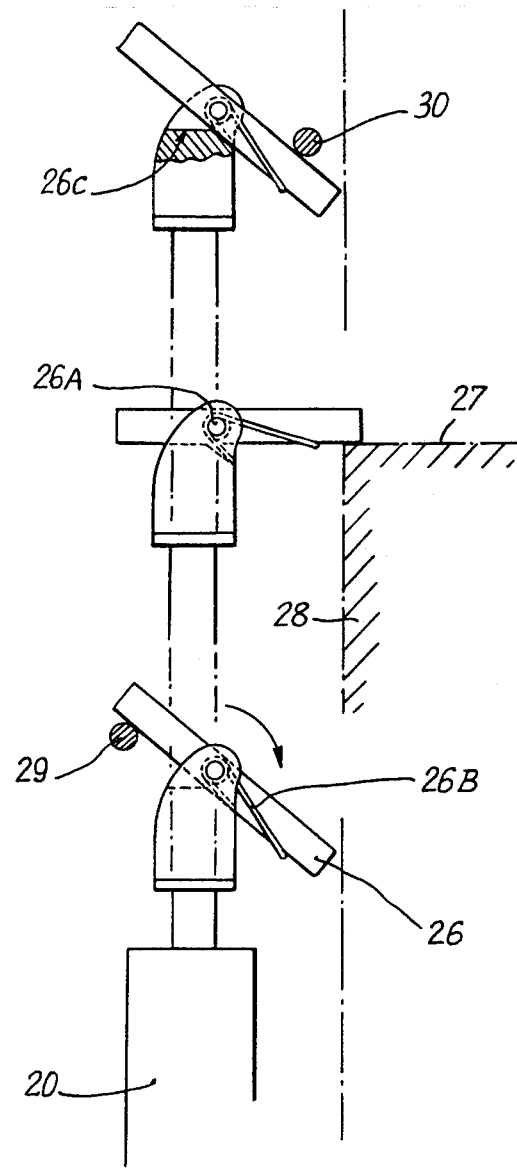
FIG. 6 shows more in detail than in FIG. 1 the ejection arm in an operative position and in two inoperative positions.

The frame structure 1 carries four pneumatic cylinders 17–20 adapted to cooperate with the buoys when the latter are brought into proper alignment with the ejection passage or barrel 3. More specifically, these cylinders include an upper release pneumatic cylinder 17, a lower release pneumatic cylinder 18, an upper ejection cylinder 19 and a lower ejection cylinder 20. The reference numeral 21 designates the arm rigid with the piston rod of cylinder 19 which controls the upper portion 22 of the upper short buoy 23 or the upper portion 24 of the long buoy 25, according to whether short or long buoys are used, and the reference numeral 26 designates the pivoting arm of cylinder 20 controlling the upper portion 27 of the lower short buoy 28. Stop members 29 and 30 (see also FIG. 6) hold the arm 26 in a retracted position in the bottommost or topmost position of the piston rod of cylinder 20. This arm 26 pivoted to the piston rod of ejection cylinder 20 about a pin 26A is responsive to a return spring 26B constantly urging this arm to its operative position, i.e. for engagement with a stop face or heel 26C rigid with this piston rod of cylinder 20; in this position, the arm can engage the upper portion 27 of a lower short buoy 28. In its two endmost positions, the piston rod of cylinder 20 shown in FIG. 6 causes the retraction of arm 26 against the antagonistic force of its return spring 26B due to the presence of stop member 29 in the lower position and stop member 30 in the upper position.

The buoy-carrying tubes 10 are disposed like the chambers of a revolver-cylinder at spaced angular intervals and on a common circle about the central shaft 4; each tube 10 is provided with two retaining devices and two locking devices.

A lower retaining device 31 is provided for both long buoys 25 and lower short buoys 28 and an upper retaining device 32 is provided for the upper short buoys 23. Each retaining device comprises on the one hand a two-armed lever 33 fulcrumed at 34 and having one arm 35 adapted to support the buoy, and on the other hand a bell-crank lever 36, fulcrumed at 37, having one arm 38 engaged, possibly with the interposition of a roller 39, by the other arm 40 of the two-armed lever 33. The other arm 41 of bell-crank lever 36 overlies the piston rod of cylinder 17 or 18 when the corresponding buoy has been selected and locked in position by the wedge member 14 engaging the corresponding keeper 16.

Figure 5:
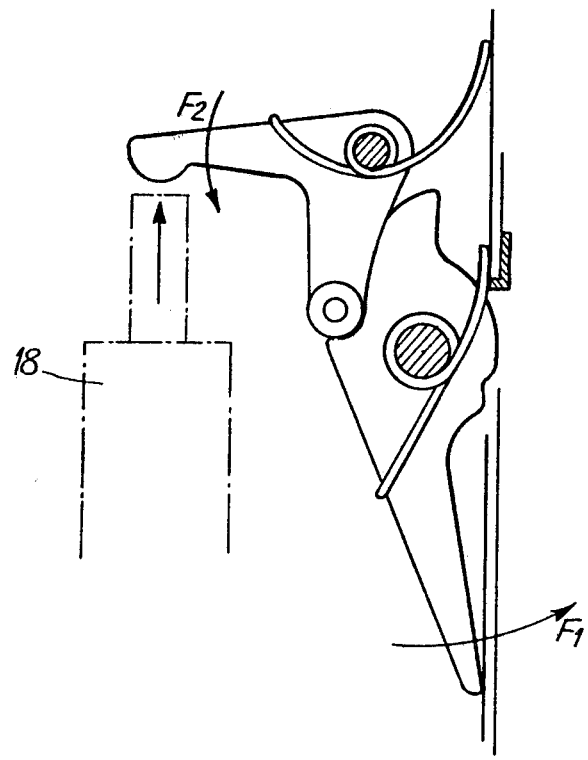
FIG. 5 illustrates on the same scale the retaining device in its release position.

Both levers 33 and 36 are responsive to stabilizing springs so arranged that relevant levers are held either in the retaining position (FIG. 4), or in the retracted position (FIG. 5). In FIG. 4 it is clear that spring 49 tends to rotate the two-armed lever 33 in the direction of the arrow F1. If no buoy is present in the tube 10, this lever will engage the stop member 50 rigid with the frame structure 1.

The other spring 48 tends to rotate the bell-crank lever 36 in the direction of the arrow F2 and to hold same in the position shown, thus preventing the two-armed lever 33 from rotating in the clockwise direction, as seen in FIG. 4. In this position the arm 35 positively holds or supports the corresponding buoy.

When cylinder 18 (or 17) is actuated, the bell-crank lever 36 is urged for clockwise rotation (i.e. in the direction opposite the one shown by the arrow F2), so that the roller 39 escapes from the beak 40 of two-armed lever 33 and the latter can pivot in the clockwise direction (opposite the arrow F1) as a consequence of the combined action of gravity and of ejection cylinder 19, this lever 33 assuming consequently the position shown in FIG. 5 against the antagonistic force of spring 49. The action exerted by cylinder 18 is fast enough to enable the lever 33 to resume meantime its initial position to lock the two-armed lever 33 in its retracted position (FIG. 5), due to the force of spring 48 which is necessarily considerably greater than that of spring 49.

Another short actuation of cylinder 18 (or 17) causes the bell-crank lever 36 to release the two-armed lever 33 so that the retaining device can resume the position of FIG. 4. All these steps are obtained only through the medium of pneumatic cylinders, without any manual intervention.

The reference numeral 42 (FIG. 1) designates the device for locking or wedging the lower short buoy 28. A compression spring 43 enclosed in a casing constantly urges an arm 44 pivoted at 45 in the direction of the arrow. When this arm is raised, the line of action of spring 43 moves to the other side of fulcrum axis 45 to provide a knee-action and consequently a stable over-center open position, as shown in the upper portion of FIG. 3. The upper locking device is identical to the lower one and engages, as the case may be, the top surface 24 of the long buoy 25 or the top surface 22 of an upper short buoy 23. The buoy-carrying tubes 10 may have a round or prismatic (ploygonal) cross-sectional configuration and consist, for example, of a cluster of rigid elements which, when assembled, constitutes an open-work guide member. The longitudinal gaps thus left between adjacent elements provide the passages necessary for accomodating the buoy-controlling retaining, locking and ejection arms. Each tube 10 comprises a lateral hinged door 47 illustrated in FIG. 2 for introducing the buoys into the corresponding tubes.

Means (not shown) are provided in the form of a control board located in the vicinity of the operator for the electric actuation of the above-described devices. This control board may comprise, for example, a programmer and electronic means for processing the data and instructions necessary for operating the buoy jettison device. This equipment is well known to those conversant with the art and its detailed description is not deemed necessary since it is no part of the present invention.

The buoys are handled in the manner set forth hereinafter. Preliminarily the pistons of the two ejection cylinders 19, 20 are brought to their high position and the pistons of the two release cylinders 17, 18 are brought to their low position, if necessary.

In case a long buoy 25 (FIG. 3) is concerned, care is taken that the lower retaining device is properly set as shown in FIG. 4, that the upper retaining device 32 is held in its release position, as shown in FIG. 5, and that the upper locking arm 46 is raised as shown in FIG. 3. If need be, these devices are moved manually to the above-defined positions by opening the lateral access doors 47 of the relevant tube. When the lower locking device has been moved by spring 43 to its retracted position shown in FIG. 3, the buoy is automatically introduced through the lateral door 47 so that it bears against the arm 35 of the lower retaining device, and the arm 46 of the upper locking device is moved to the position shown in FIG. 1 so that it bears against the top face 24 of buoy 25. After reclosing the lateral door 47, the next tube is loaded, for example, with a pair of short buoys.

In this case, the operator firstly checks that the lower and upper retaining devices are properly set and that the locking devices are raised. As in the preceding case, the short lower buoy 28 is introduced and the arm of the lower locking device is moved to the position shown in FIG. 1, so that it bears against the top face 27 of buoy 28. The upper short buoy 23 is introduced in the same manner.

When all the tubes are loaded, the selected tube to be fired is brought in axial alignment with the ejection passage 3 by energizing the electric motor 11. Shortly before this position is reached, the positioning device is actuated for stopping the revolver-cylinder exactly in the firing position and at the same time the motor 11 is deenergized.

It is clear that all the necessary operations take place automatically under the control of the electronic programmer. When a tube is to be fired and assuming that it contains two buoys, the lower release cylinder 18 is actuated to rotate the bell-crank lever 36 and thus release the retaining device 31. The lower ejection cylinder 20 is also actuated and ejects the lower buoy 28. All the members likely to interfere with or prevent the subsequent ejection of the upper buoy 23 are retracted automatically; the pressure in the lower release cylinder is maintained during a time period short enough to enable the lower retaining device to assume the position shown in FIG. 5, as already explained hereinabove.

The knee-action lever 44 of the lower wedging device 42 is normally urged by compression spring 43 to the position shown in FIG. 3. Finally, the pivoting arm 26 of cylinder 20 assumes the position shown in phantom lines, when the piston rod of cylinder 20 is in its bottommost position, due to its engagement with stop member 29. Under these conditions, the upper buoy can be ejected in a similar fashion. The release cylinders and the ejection cylinders are then restored to their initial positions, respectively, and perform their inherent functions irrespective of the type of loading contemplated for the next tube to be fired.

The empty tube is replaced by the next selected tube by rotating the revolver cylinder accordingly after unlatching the positioning device and relatching same in the new position. If the tube to be fired contains a long buoy, it is obvious that only the retaining device 31 and the upper ejection cylinder 19 are actuated.

What we claim is:

1. A buoy jettison device having an ejection passage for transporting and ejecting buoys on and from aircraft, which comprises:
    (a) a revolver cylinder mounted to rotate about a fixed central axis rigid with the aircraft, said revolver cylinder comprising a plurality of angularly spaced tubes disposed on a circle and each adapted to receive one of a long buoy or two short buoys,
    (b) drive means adapted to rotate said revolver cylinder about said central axis and to place the bottom of a selected tube of said revolver cylinder to register with said ejection passage of said device,
    (c) two retaining means associated with each tube of the revolver cylinder and comprising a lower retaining means disposed at the bottom of the tube and adapted to retain one of a long buoy or a lower short buoy and an upper retaining means adapted to retain an upper short buoy, each retaining means comprising a two-armed lever pivoted to the tube and adapted to take one of a working position in which one arm of the lever projects through the tube or a release position in which said lever arm does not project through the tube, spring means to maintain said lever in one of its working position or release position, and control means to selectively release one of the lower or upper retaining means of the tube registering with said ejection passage for jettisoning one of a long buoy or a short buoy, (d) two wedging means associated with each tube of the revolver cylinder and comprising an upper wedging means disposed at the top of the tube and adapted to engage one of the top surface of a long buoy or of an upper short buoy and a lower wedging means disposed under the upper retaining means and adapted to engage the top surface of a lower short buoy, each wedging means comprising a lever pivoted to the tube and selectively urged by spring means in one of an operative buoy engaging position or an inoperative position in which it does not engage the buoy, and (e) a laterally opening door provided on each tube for the loading thereof with one of a long buoy or with two short buoys.

2. A buoy jettison device as claimed in claim 1 further including a pivoting-bell crank lever wherein the two-armed lever of each retaining means co-acts with one end of said pivoting bell-crank lever of which the other end co-acts, when the tube carrying said retaining means registers with the ejection passage, with the movable rod of a cylinder rigid with the central axis of the device so that when the retaining lever is in its working position said bell-crank lever co-acts therewith under a spring action to maintain said retaining lever in its retaining position while, after actuation of said cylinder rod, said bent lever frees the retaining lever allowing it to take its release position under the load action and then engages again said retaining lever to lock it in its release position.

3. A buoy jettison device as claimed in claim 1 or claim 2 wherein two ejection devices responsive to pneumatic cylinders are provided, one ejection device controlling one of the long buoys or the upper short buoys, the other ejection device controlling the lower short buoys, said other ejection device retracting automatically at the end of its ejection stroke to permit one of the jettisoning and ejection of the upper short buoy associated therewith, or the possible use of the long buoy.

4. The buoy jettison device as claimed in claim 1 wherein an electric motor is provided for rotatably driving said revolver-cylinder through transmission means, means being provided for accurately positioning said revolver-cylinder in successive buoy-jettisoning positions corresponding to the selected buoy to be brought in axial alignment with a single firing barrel provided in the aircraft.

* * * * *